United States Patent
Levers et al.

(10) Patent No.: US 9,604,413 B2
(45) Date of Patent: Mar. 28, 2017

(54) ASSEMBLING AND SHAPING LAMINATE PANEL

(71) Applicant: AIRBUS OPERATIONS LIMITED, Bristol (GB)

(72) Inventors: Andrew Levers, Bristol (GB); Gary Wiles, Bristol (GB)

(73) Assignee: AIRBUS OPERATIONA LIMITED, Bristol (GB)

( * ) Notice: Subject to any disclaimer, the term of this patent is extended or adjusted under 35 U.S.C. 154(b) by 75 days.

(21) Appl. No.: 14/269,307

(22) Filed: May 5, 2014

(65) Prior Publication Data

US 2014/0238610 A1  Aug. 28, 2014

Related U.S. Application Data

(62) Division of application No. 13/059,304, filed as application No. PCT/GB2009/051085 on Aug. 28, 2009, now Pat. No. 8,715,561.

(30) Foreign Application Priority Data

Sep. 4, 2008  (GB) .................................. 0816114.3

(51) Int. Cl.
  *B29C 70/44* (2006.01)
  *B29C 70/34* (2006.01)
  *B29C 70/38* (2006.01)

(52) U.S. Cl.
  CPC ............ *B29C 70/44* (2013.01); *B29C 70/342* (2013.01); *B29C 70/386* (2013.01); *Y10T 156/1044* (2015.01); *Y10T 428/24628* (2015.01)

(58) Field of Classification Search
  CPC .............................. B29C 70/342; B29C 70/44
  See application file for complete search history.

(56) References Cited

U.S. PATENT DOCUMENTS 6,484,776 B1    11/2002  Meilunas et al.
6,669,360 B1 *  12/2003  Adelmann ........... B65D 90/623
                                                     366/192

(Continued)

FOREIGN PATENT DOCUMENTS

GB       2268699 A     1/1994
GB       2440012 A     1/2008

(Continued)

OTHER PUBLICATIONS

UK Search Report for GB0816114.3, dated Jan. 5, 2009.

(Continued)

*Primary Examiner* — Ryan Ochylski
(74) *Attorney, Agent, or Firm* — Hauptman Ham, LLP

(57) ABSTRACT

A method of assembling and shaping a laminate panel. An intermediate member is mounted on a lay-up table and a lay-up is assembling by laying a series of plies onto the intermediate member on the lay-up table. The intermediate member and the lay-up are then removed from the lay-up table and placed them on a shaped surface. The lay-up is then forced against the shaped surface, via the intermediate member, in a manner that modifies the shape of the lay-up to form a shaped laminate panel. Finally the shaped laminate panel is removed from the intermediate member. The lay-up table can thus support the flexible intermediate member during assembly, and can be relatively flat to enable the lay-up to assembled by an automated process.

12 Claims, 4 Drawing Sheets

(56) References Cited

U.S. PATENT DOCUMENTS

| | | |
|---|---|---|
| 7,390,454 B2 | 6/2008 | Ostrander et al. |
| 2005/0086916 A1 | 4/2005 | Caron |

FOREIGN PATENT DOCUMENTS

| | | | |
|---|---|---|---|
| JP | 2162016 | A | 6/1990 |
| JP | 2196609 | A | 8/1990 |
| JP | 2002337094 | A | 11/2002 |
| WO | 2004054735 | A1 | 7/2004 |
| WO | 2007010052 | A1 | 1/2007 |

OTHER PUBLICATIONS

International Search Report for PCT/GB2009/051085 mailed Jul. 2, 2010.
Russian Office Action with English translation dated May 24, 2013 for Application No. 2011110339/05(015150).

\* cited by examiner

ASSEMBLING AND SHAPING LAMINATE PANEL

RELATED APPLICATIONS

The present application is a divisional of U.S. application Ser. No. 13/059,304, filed Feb. 16, 2011, which is a national phase of PCT/GB2009/051085, filed on Aug. 28, 2009 and is based on, and claims priority from, Great Britain Application Number 0816114.3, filed Sep. 4, 2008. The disclosures of which are hereby incorporated by reference in their entirety.

FIELD OF THE INVENTION

The present invention relates to a method and apparatus for assembling and shaping a laminate panel.

BACKGROUND OF THE INVENTION

WO2004054735 described the use of an "intermediate member" in the formation of a shaped panel. Although primarily directed to the manufacture of a metallic panel, it is mentioned that the apparatus could be used to form composite materials, for example, where the component is formed from a multiplicity of fibre layers in a resin.

A problem with using the arrangement of WO2004054735 to form a laminate panel is that it is difficult to assemble the panel by laying a series of plies onto the intermediate member. This is because the intermediate member has a complex curved shape which makes it difficult to assemble the lay-up without the formation of wrinkles. One solution to this problem would be to assemble the lay-up manually, but this can be time consuming and expensive. WO2004054735 does mention that the intermediate member could be flat. However even if the intermediate was flat, it would bow as the plies are assembled due to its inherent flexibility.

SUMMARY OF THE INVENTION

A first aspect of the invention provides a method of assembling and shaping a laminate panel, the method comprising: mounting an intermediate member on a lay-up table; assembling a lay-up by laying a series of plies onto the intermediate member on the lay-up table; removing the intermediate member and the lay-up from the lay-up table and placing them on a shaped surface; forcing the lay-up against the shaped surface, via the intermediate member, in a manner that modifies the shape of the lay-up to form a shaped laminate panel; and removing the shaped laminate panel from the intermediate member.

The lay-up table can thus support the flexible intermediate member during assembly, and can be relatively flat to enable the lay-up to assembled easily. Assembly of the lay-up may be performed by hand, or more preferably by an automated process.

The lay-up may be forced against the shaped surface by a mechanical clamping force, but more preferably it is forced against the shaped surface by means of an air pressure difference, typically at least partially provided by suction, and typically created by laying a vacuum bag onto the lay-up on the intermediate member; and generating a partial vacuum between the vacuum bag and the shaped surface. Optionally a caul plate may be provided between the vacuum bag and the lay-up.

After the lay-up has been shaped, then it may be desirable to co-cure one or more composite components, such as stringers, to the shaped laminate panel. Where a vacuum bag is used, then it will be necessary to remove the vacuum bag to make the panel 2(1 accessible. However a problem with this is that the panel may spring back to its original shape when the vacuum is released. This problem can be solved by forcing the intermediate member against the shaped surface, after the vacuum bag has been removed, by forming an airtight seal between the intermediate member and a vacuum box in order to form a vacuum chamber, the vacuum chamber containing the shaped surface; and generating a partial vacuum in the vacuum chamber.

The airtight seal may be formed for example by bagging material taped to the intermediate member and to the vacuum box, or by inflating a seal member between the intermediate member and the vacuum box.

Each ply in the lay-up may comprise a series of fibres (such as carbon fibres) impregnated with a matrix (such as epoxy resin). Alternatively each ply may comprise a dry fibre ply which is subsequently infused with resin.

Typically the shaped laminate panel is cured after the shaping step, for instance by heating the panel in an oven or by infra-red heating, or by any other curing technique. In this case the shaping step may be performed in the oven or outside the oven.

A second aspect of the invention provides apparatus for assembling and shaping a laminate panel, the apparatus comprising: a flexible intermediate member; a lay-up table which can support the flexible intermediate member; and a shaped surface against which a lay-up can be forced, via the intermediate member, in a manner that modifies the shape of the lay-up to form a shaped laminate panel.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
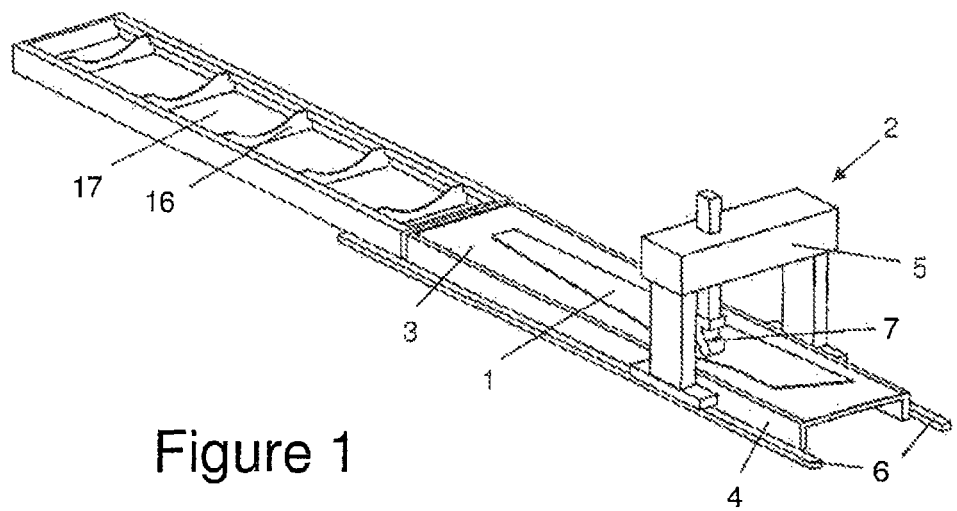
FIG. 1 shows a lay-up being assembled by an Automated Tape Layer (ATL) machine.

FIG. 1 shows a lay-up 1 for a laminate panel being assembled by an Automated Tape Layer (ATL) machine 2.

The ATL machine 2 assembles the lay-up 1 by laying a series of plies onto an intermediate member 3 mounted on a lay-up table 4.

The intermediate member 3 is made of a flexible material such as Invar, stainless steel or other ferrous material, or a composite material, and has a substantially constant thickness.

The ATL machine 2 comprises a frame 5 mounted on a pair of tracks 6. The frame 5 carries an ATL head 7 which lays a "prepreg" tape in a series of narrow stripes—the direction of the stripes being controlled by movement of the ATL head on the frame 5, and movement of the frame 5 along the tracks 6. Thus each ply of the lay-up 1 is formed by a series of stripes of tape. The "prepreg" tape comprises a series of uni-directional carbon-fibres impregnated with an epoxy resin matrix. Typically the fibre direction varies between plies in order to give the panel strength in different directions.

The fact that the intermediate member 3 and lay-up table 4 are substantially flat makes it relatively easy to lay the tape in such an automated manner.

Figure 2:
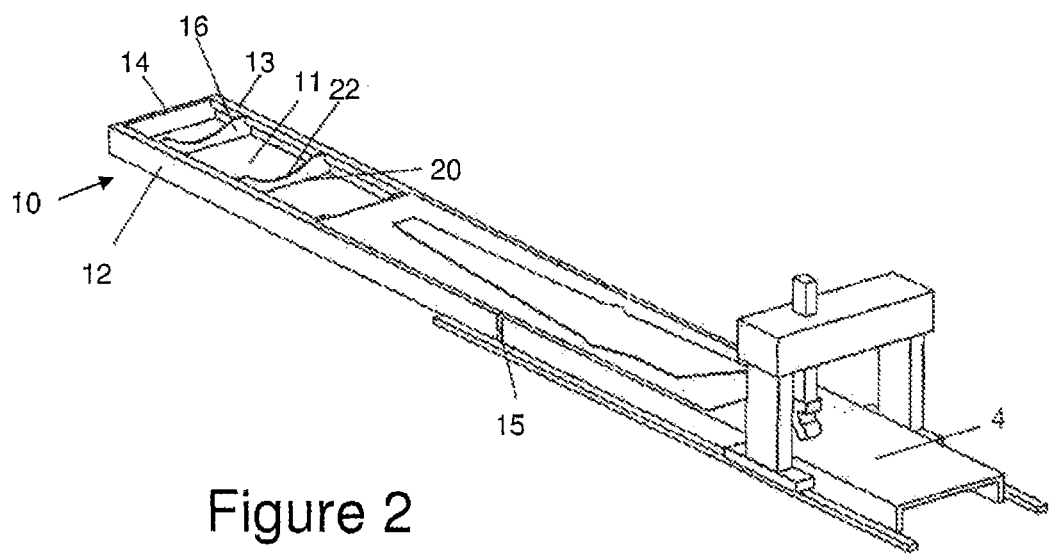
FIG. 2 shows the intermediate member and the lay-up being removed from the lay-up table and placed on a shaped surface in a vacuum box.

FIG. 2 shows the intermediate member carrying the lay-up being removed from the lay-up table and placed on a shaped surface in a vacuum box 10. The vacuum box 10 comprises a floor 11, left side wall 12, right side wall 13, front end wall 14 and rear end wall 15. The shaped surface comprises a series of rib boards 16, three of such rib boards being shown in FIG. 2. Each rib board 16 has a base 20 which engages the floor 11 of the vacuum box, and a shaped upper face 22. Thus the rib boards 16 and vacuum box form an open structure, with gaps between adjacent rib boards.

Figure 3:
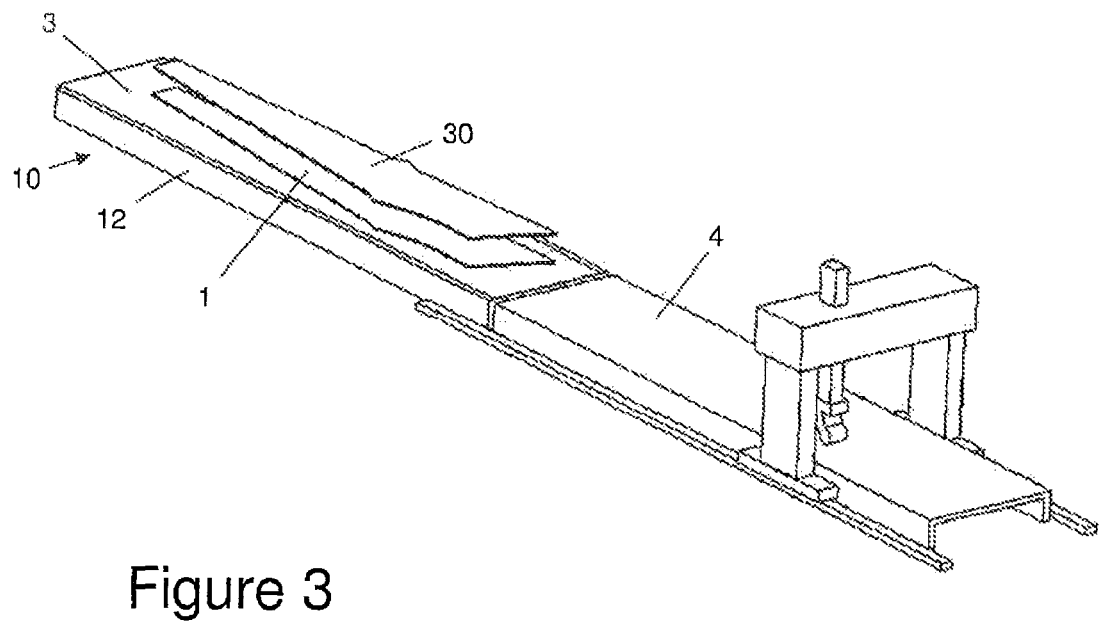
FIG. 3 shows a caul plate being placed on the lay-up.
Figure 4:
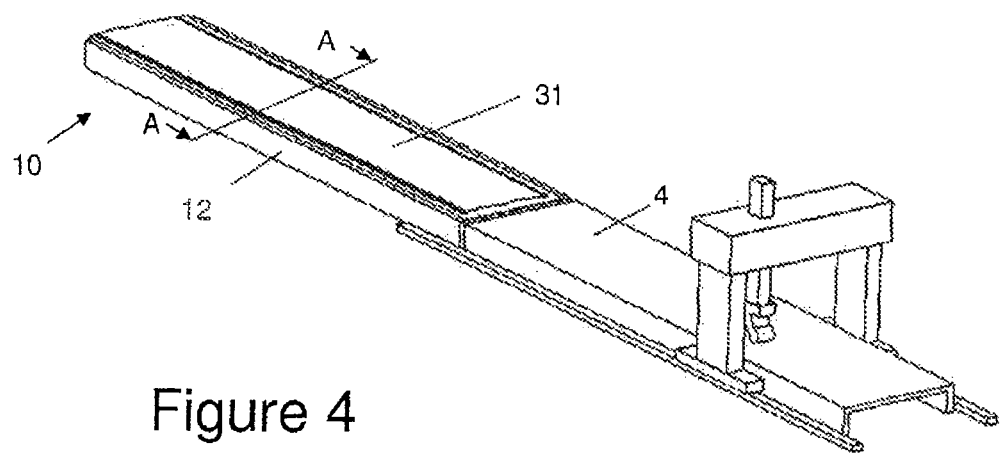
FIG. 4 shows the assembly after a vacuum bag has been fitted.

When the intermediate member 3 and lay-up 1 are in place on the vacuum box 10, a caul plate 30 is placed on the lay-up 1 as shown in FIG. 3. Next a flexible vacuum bag 31 shown in FIG. 4 is fitted. The vacuum bag 31 may be a re-usable vacuum bag, or a single use Capran (R) vacuum bag.

Figure 5:
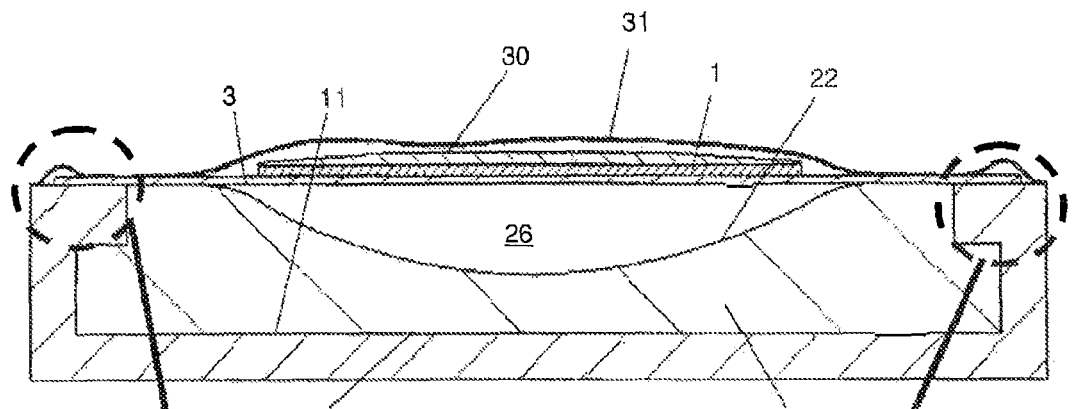
FIG. 5 is a cross-section of the assembly taken along a line A-A in FIG. 4.

FIG. 5 is a cross-sectional view along a line A-A through one of the rib boards 16. An airtight seal is formed between the vacuum bag 31 and the vacuum box 10 by a ring of sealing tape 33 shown in FIGS. 5a and 5b.

Additionally, an airtight seal is formed between the intermediate member 3 and the top of the vacuum box 10. This seal may be formed in one of two alternative ways shown in FIGS. 5a and 5b.

Figure 5A:
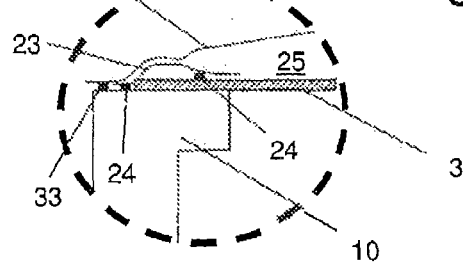
FIG. 5a is a detailed view showing a first sealing arrangement.

In the arrangement shown in FIG. 5a, the seal between the intermediate member 3 and the vacuum box 10 is created by a ring 23 of bagging material which is attached to the intermediate member 3 and the vacuum box 20 by a pair of rings of sealing tape 24. This creates two sealed vacuum chambers, namely:

a lower vacuum chamber 26, labelled in FIG. 5, between the vacuum box 10 and the intermediate member 3; and
an upper vacuum chamber 25, labelled in FIG. 5a, between the intermediate member 3 and the vacuum bag 31.

Figure 6:
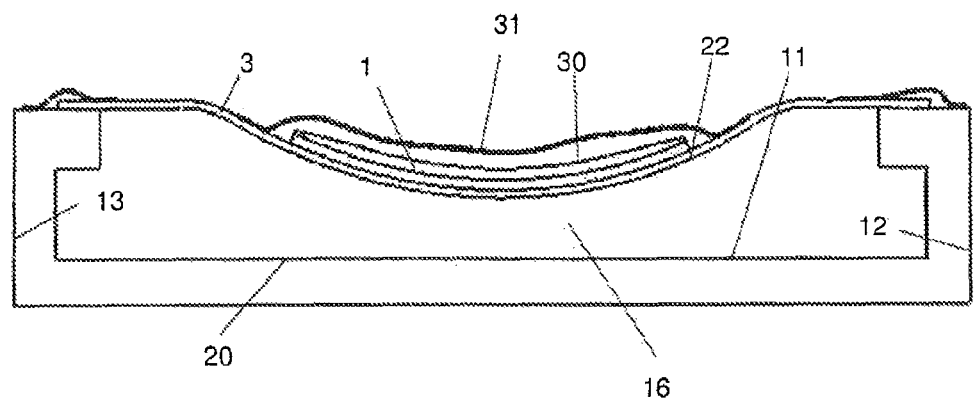
FIG. 6 is a cross-section of the assembly taken along the line A-A during vacuum forming of the laminate panel.

Next the vacuum chambers 25, 26 are partially evacuated via a first vacuum port (not shown) in the vacuum hag 31 and a second vacuum port (not shown) in the vacuum box respectively. This creates a pressure difference which forces the lay-up 1 against the shaped surface, via the intermediate member 3, in a manner that modifies the shape of the lay-up as shown in FIG. 6. The vacuum bag 31 and caul plate 30 also press against the lay-up and cause it to debulk. The bagging material seal 23 has some slack which allows the intermediate member 3 to slip laterally against the vacuum box 10 as it bends.

Figure 7:
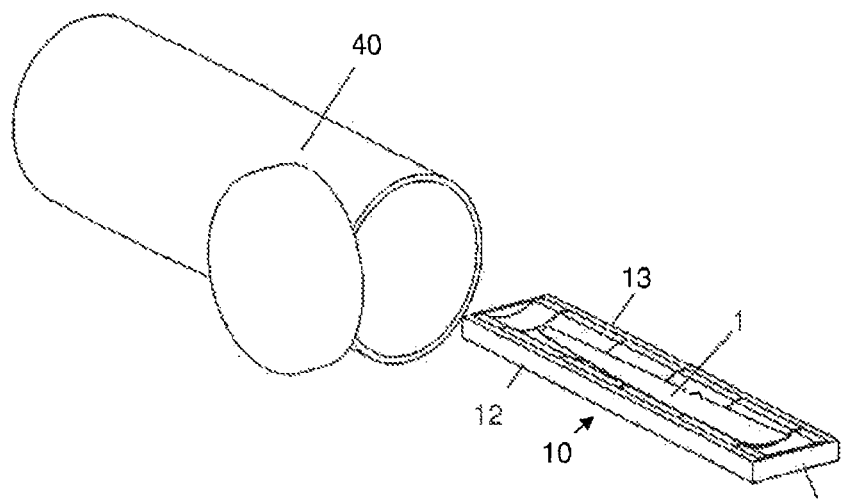
FIG. 7 shows the shaped laminate panel, intermediate member and vacuum box being inserted into an autoclave.

Next the shaped laminate panel, intermediate member and vacuum box are transferred to an autoclave 40 as shown in FIG. 7. The panel is then cured in the autoclave 40 in either a one-step cure process or a two-step cure process.

In the case of a one-step cure process, the vacuum bag 31 and caul plate 30 are removed either before or after the vacuum box has been transferred to the autoclave 40. The seal 23, 24 remains in place so that the partial vacuum is maintained in the lower vacuum chamber 26. This ensures that the intermediate member 3 remains forced against the rib boards 16 and thus retains its distorted shape as shown in FIG. 8, even after the vacuum bag 31 has been removed.

Figure 8:
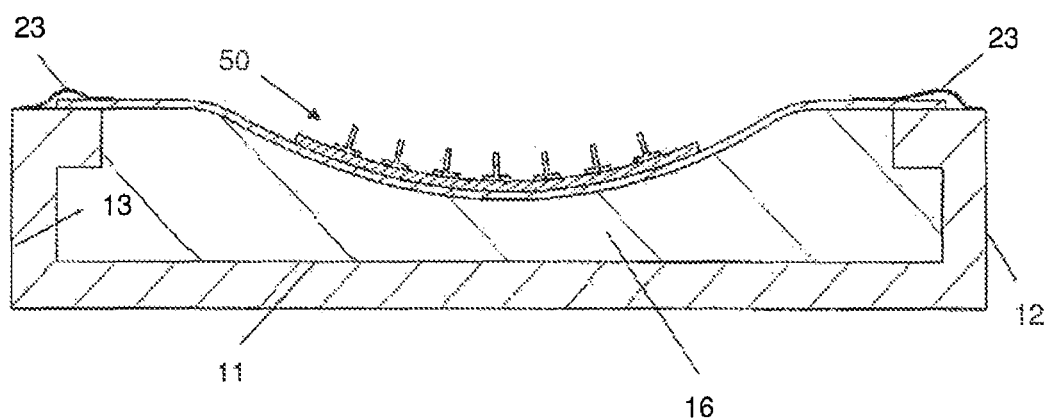
FIG. 8 is a cross-section of the assembly with a series of stringers laid onto the shaped laminate panel.

A series of stringers 50 are then laid onto the upper face of the shaped laminate panel as shown in FIG. 8. The vacuum bag 31 is then laid back on to the assembly shown in FIG. 8, on top of the stringers. The upper vacuum chamber 25 is then partially evacuated to debulk the stringers, and the panel and stringers are co-cured in the autoclave 40 by a combination of temperature and pressure.

In the case of a two-step cure process, the vacuum bag and caul plate are left in place as the vacuum box is transferred to the autoclave. The panel is then partially cured in a first curing stage by a combination of temperature and pressure. After the first curing stage the vacuum bag and caul plate are removed and the stringers 50 are laid onto the partially cured panel, as shown in FIG. 8. The vacuum bag 31 is then laid back on to the assembly on top of the stringers. The panel and stringers are then co-cured in a second curing stage by a combination of temperature and pressure.

After curing (either by the one-step or the two-step curing process) the cured laminate panel, intermediate member and vacuum box are removed from the autoclave 40, the vacuum is released, the caul plate and vacuum bag are removed, and the intermediate member is returned to the lay-up table. The cured laminate panel can be removed from the intermediate member 3 before or after it is returned to the lay-up table.

The shape of the shaped surface can be modified by replacing one or more of the rib boards 16 with a new rib board having a different shape to its upper face 22. The process can then be repeated to manufacture another shaped laminate panel using the new shaped surface.

Figure 5B:
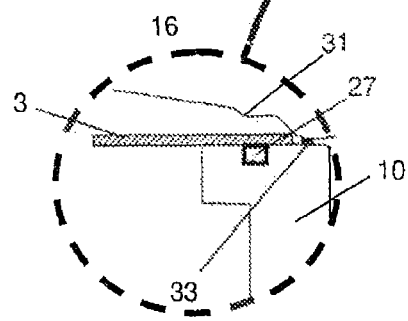
FIG. 5b is a detailed view showing a second sealing arrangement.

In the alternative sealing arrangement shown in FIG. 5b, the seal between the intermediate member 3 and the vacuum box 10 is created by an inflatable sealing ring 27 instead of a ring of bagging material 23. The sealing ring 27 is deflated for the initial panel shaping process outside the autoclave. This enables air to flow between the upper and lower chambers 25, 26, so only a single vacuum port is required (either in the vacuum bag 31 or in the vacuum box 10). It also allows the intermediate member 3 to slip laterally against the vacuum box 10 during the shaping process without damaging the sealing ring 27.

After the shaping step (and optionally after a first curing stage), the sealing ring 27 is inflated to seal the evacuated lower vacuum chamber 26, enabling the vacuum bag 31 to be removed and the stringers 50 placed on the lay-up without the panel and intermediate member springing back to a flat shape. The vacuum bag 31 is then laid back on to the assembly on top of the stringers. The panel and stringer are then co-cured in the autoclave. The sealing ring 27 can be either inflated or deflated during the co-cure process.

Although the invention has been described above with reference to one or more preferred embodiments, it will be appreciated that various changes or modifications may be made without departing from the scope of the invention as defined in the appended claims.

The invention claimed:

1. Apparatus for assembling and shaping a laminate panel, the apparatus comprising: a flexible intermediate member; a lay-up table which can support the flexible intermediate member; a shaped surface against which a lay-up can be forced, via the intermediate member, in a manner that modifies the shape of the lay-up to form a shaped laminate panel; a vacuum box; and a sealing member for forming an airtight seal between the intermediate member and the vacuum box, wherein the shaped surface comprises a plurality of shaping members, each shaping member having a shaped upper face which defines part of the shaped surface, wherein each shaped upper face is in the vacuum box.

2. The apparatus of claim 1 wherein the shaped upper face of at least one of the shaping members in the vacuum box is concave.

3. The apparatus of claim 1 wherein each shaping member has a base which engages a floor of the vacuum box.

4. The apparatus of claim 1 wherein the plurality of shaping members comprises a series of rib boards, each rib board having a base which engages a floor of the vacuum box.

5. The apparatus of claim 4 wherein the rib boards and vacuum box form an open structure, with gaps between adjacent rib boards.

6. The apparatus of claim 5, wherein the gaps between adjacent rib boards extend from the floor of the vacuum box to the shaped upper faces of the rib boards.

7. The apparatus of claim 4, wherein the shaped upper face of at least one of the rib boards is concave.

8. The apparatus of claim 1 wherein the intermediate member and lay-up table are substantially flat.

9. The apparatus of claim 1 wherein the sealing member comprises an inflatable sealing ring.

10. The apparatus of claim 1, wherein the vacuum box comprises a floor, left side wall, right side wall, front end wall and rear end wall.

11. The apparatus of claim 10, wherein the plurality of shaping members comprises a series of rib boards, each rib board having a base which engages a floor of the vacuum box, a left edge which engages the left side wall of the vacuum box, and a right edge which engages the right side wall of the vacuum box.

12. The apparatus of claim 11 wherein the shaped upper face of at least one of the rib boards is concave.

* * * * *